Figure 3:
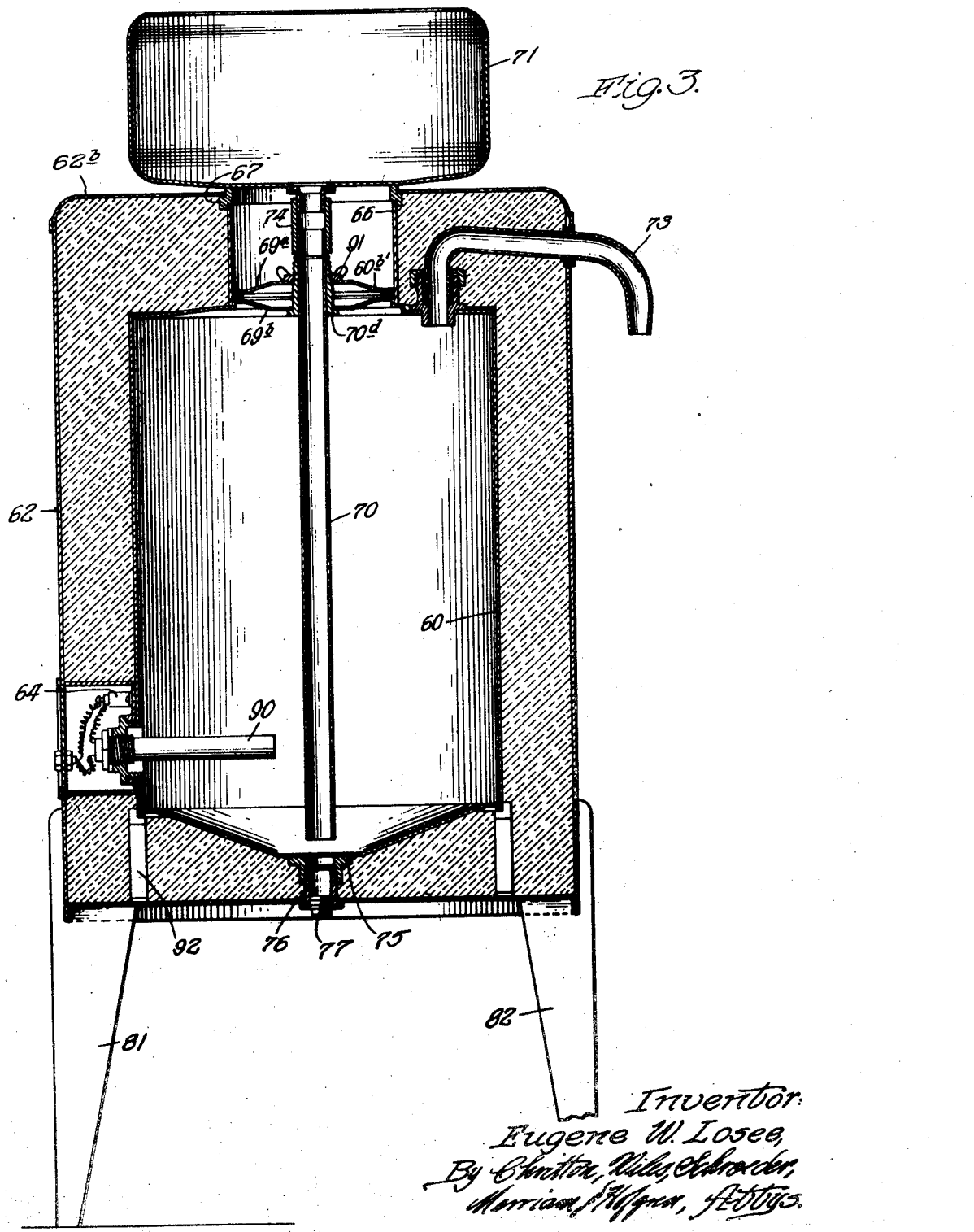

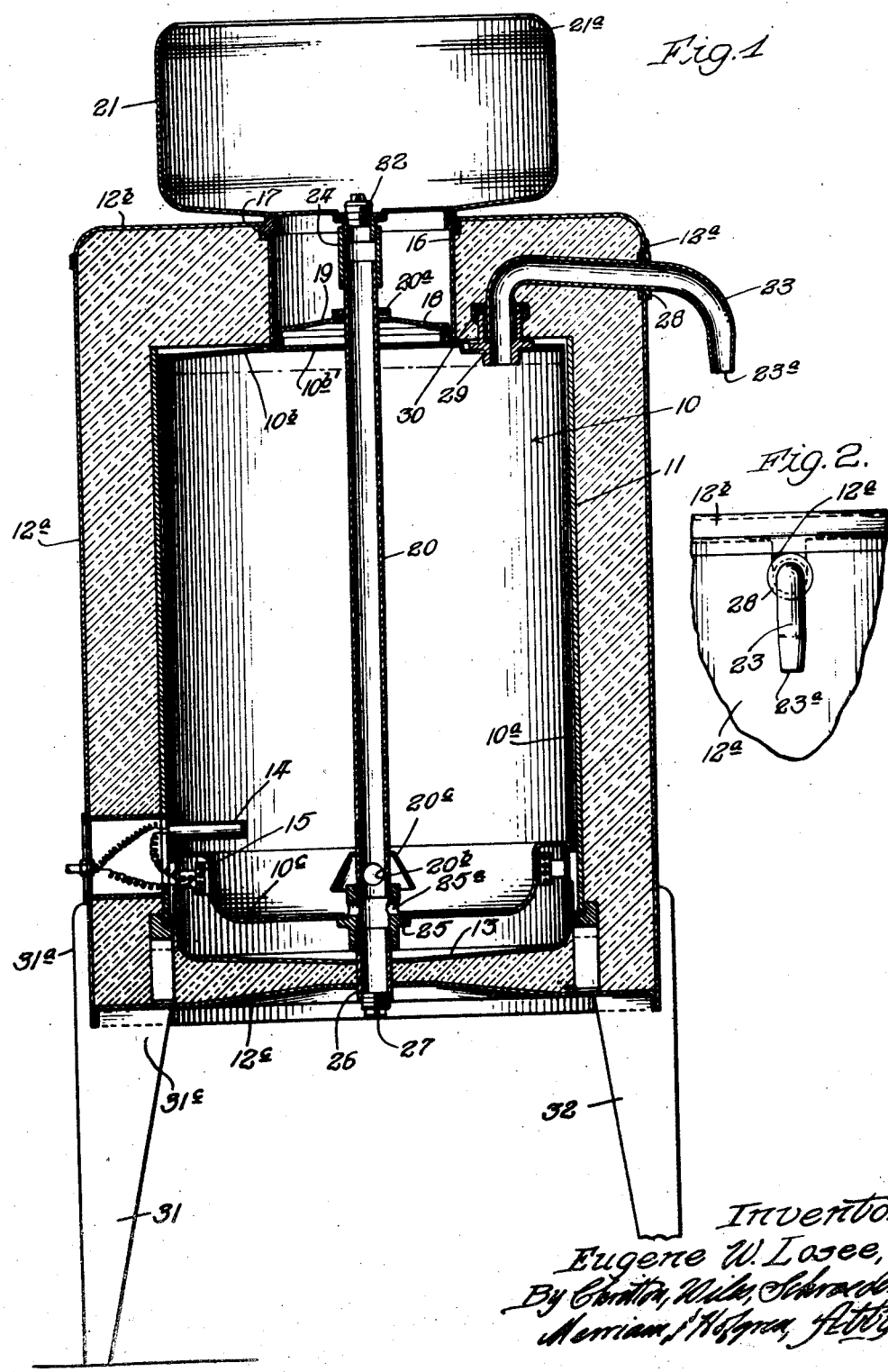

June 17, 1947.  E. W. LOSEE  2,422,492
DISPLACEMENT-TYPE ELECTRIC WATER HEATER
Filed Dec. 15, 1944  2 Sheets—Sheet 2

Inventor:
Eugene W. Losee,

Patented June 17, 1947

2,422,492

UNITED STATES PATENT OFFICE 2,422,492

DISPLACEMENT-TYPE ELECTRIC WATER HEATER

Eugene W. Losee, Hebron, Ill., assignor to Losee Products Co., a corporation of Illinois Application December 15, 1944, Serial No. 568,233

12 Claims. (Cl. 219—38)

This invention relates to a water heater, and more particularly to an electric water heater of the displacement type.

One feature of this invention is that it provides an improved water heater of the type wherein a desired quantity of hot water is secured by supplying an approximately equal quantity of cold water into the heater, whereupon the hot water is displaced therefrom and delivered to a pail or other receptacle; another feature of this invention is the provision of a relatively large opening extending into the interior of the inner tank to facilitate access to and cleaning thereof; still another feature of this invention is the provision of easily removable closure means for such large opening, so constructed and arranged as to prevent any substantial loss of heat from the tank; yet another feature of this invention is that the cold water supply pipe is arranged to pass through the large opening and the closure end to cooperate with the closure means to hold the same in closed position; a further feature is the use of a large annular electric heating element of large area in an air chamber in good heat transfer relation with the water in the tank, providing improved life of the heating element; a still further feature of the heater is a construction and arrangement enabling the inner tank and the outlet and drain pipes connected thereto to be readily and conveniently removed as a unit from the remainder of the heater; yet a further feature of this invention is the provision of a reduced end on the outlet pipe, the outer end of this pipe being of substantially less area than the inner end to ensure maintenance of the desired siphon action at all times despite the fact that some clogging of the pipe, and particularly the inner end thereof, is incident to usage of the heater for long periods; and another feature of this invention is the provision of an improved leg construction providing simplicity of manufacture with improved appearance and strength. Other features and advantages of this invention will be apparent from the following specification and the drawings, in which:

Figure 1 is a vertical sectional view of a preferred embodiment of a water heater embodying my inventions; Figure 2 is a fragmentary side elevational view of the outer end of the delivery pipe and of the adjacent portion of the heater, looking from the right of Figure 1; and Figure 3 is a vertical sectional view of another or modified form of water heater embodying certain of my inventions.

There are many places where a quantity of hot water is needed at periodic intervals, one such place being in the milk house of the average dairy farm. There it is desirable to have five or ten gallons or so of hot water available at each milking period. Hot water may be desired for several purposes at each milking, the principal need being for sufficient hot water thoroughly to wash out the milking utensils after the milking has been completed. Where the requirements are of this type, with a relatively long period between withdrawals of hot water, an electric water heater is particularly satisfactory and efficient. The particular water heater shown in the accompanying drawings and subsequently described has been particularly designed and is intended for use on dairy farms; but it will be apparent that the inventions hereinafter claimed are applicable to water heaters of this general type regardless of where they may be used.

The inventions disclosed and claimed herein are improvements in electric water heaters of the displacement type, heaters of this general type being known to the art and in commercial use. Some of the advantages of a displacement heater, and the general construction and operation thereof, have been fully set out in Joseph S. Losee Reissue Patent 21,893 of March 12, 1940. Accordingly, the general principles, operation, and advantages of such a heater will only be briefly mentioned at this time, reference being made to the above patent if further disclosure is desired.

Generally speaking, a water heater of this displacement type comprises an inner tank, generally of non-corroding metal such as copper; a heat-insulating enclosure for this tank; and water supply and delivery connections. The enclosure generally comprises heat-insulating material such as rock wool, fiber glass, or the like; an outer metal shell providing protection for the heat-insulating material and a material which can be enameled or finished in some other desired manner to make the heater more attractive in appearance; and some kind of base or support means, generally three legs. The water supply means may comprise a direct connection to a water pipe, but generally comprises an open vessel on the top of the heater, acting both as a temporary reservoir and as a funnel, with a pipe connection running down to a point adjacent the bottom of the inner tank to discharge cold water poured into the vessel at a point near the bottom of the inner tank. The delivery means comprises a pipe connection so arranged that hot-water overflowing from the top of the tank (as cold water is supplied to the bottom thereof) is delivered outside the tank through a discharge pipe at a height far enough above the floor that not only a pail, but also a wash tub, washing tank of the kind used for washing milking machines, and the like, may be conveniently filled. An arrangement of this general type is fully disclosed and claimed in the above-mentioned Losee reissue patent.

Referring now to the particular embodiment of my invention illustrated in Figures 1 and 2, the heater is shown as having an inner metal tank 10, which may be of copper and have a capacity of about ten gallons, and a heat-insulating enclosure surrounding it. This enclosure comprises several parts. Immediately around and only slightly spaced from the inner tank 10, so that it is a loose but closely sliding fit therewithin, is a cylindrical member 11 of rigid material, as stiff wire mesh or a heat-insulating plastic. Spaced from this cylinder and from the inner tank 10 and completely surrounding the same is an outer metal shell, which may be of sheet iron enameled or otherwise appropriately finished, comprising a main cylindrical body part 12a, a top part 12b, and a bottom part 12c. Below the bottom of the inner tank 10 and spaced a couple of inches therefrom to provide an air space for purposes hereafter discussed, is a false bottom 13 of sheet metal. Between the top 10b of the tank and the shell top 12b, between the cylindrical member 11 and the shell portion 12a, and between the false bottom 13 and the shell bottom 12c is a substantial thickness (as from three to five inches) of appropriate heat-insulating material. While this insulating material may be of the so-called loose type filled into the space provided therefor, it is preferably in the form of blocks or bricks so that the heat-insulating material at the top may be more conveniently removed for removal of the inner tank, as will be hereafter more fully described. Extending in to the inner tank through a small opening in the side wall 10a thereof is a thermostat cartridge 14. The bottom of the inner tank 10c is first shaped in and then dropped down to provide an annular air space surrounding the bottom of the tank and forming part of an air space extending all across the bottom of the tank immediately above the false bottom 13. Mounted in the upper part of this air chamber on appropriate insulating brackets in such manner as to extend around the vertical portion of the inner tank bottom 10c is an annular electrical heating element here identified as 15. This heating element may, as shown here, comprise four loops of resistance element coils, so that there is a substantial length of resistance element and a substantial area for discharge of heat therefrom. This enables a given amount of electric power (as for example 250 or 500 watts) to be substantially continuously delivered to the heater, when necessary, with a minimum of deterioration of the heating element. Heaters of this type heretofore in commercial use have used cartridge type heating elements wherein the resistance element was necessarily of relatively short length and small area requiring it to be run at a much higher temperature for a given amount of heat input. The heating element 15 has one end connected to one end of the thermostat cartridge 14, connections to the electric supply line being made from the other terminals of the heating element and thermostat cartridge. The thermostat may be initially set to the desired water temperature (as 160°) and heat will be supplied to the heater by the heating element 15 whenever the temperature of the heater in the inner tank, and particularly that at the bottom thereof, drops below the chosen temperature. The top 10b of the inner tank is provided with a large central opening surrounded by a channel portion 10b' formed in the middle in the top of the inner tank, this opening preferably being in the neighborhood of six or eight inches in diameter. The heat-insulating enclosure is provided with a well registering with this opening, the well being defined by a clindrical member 16 of sheet metal held in proper position by cooperation of the flange at its lower end and by engagement with a shoulder formed in an annular member 17 of heat-insulating material, as plastic, having another shoulder snugly engaging the edges of an opening in the top portion 12b of the outer shell. A gasket 18 of rubber or similar resilient material is located on top of the flange portion 10b' and is adapted to receive the edges of a circular dished closure member 19. This member is preferably so formed that it is in the shape of an inverted cup in a natural or unstressed position, being stressed somewhat to the position shown in the drawing in order to keep the outer edges thereof resiliently pressing against the gasket to seal the opening when the member 19 is in closed position. The cold water supply means for the heater includes a pipe 20 passed through the closure member 19 and provided with a flange 20a adapted to force the center of the closure 19 down into the position shown in the drawings.

The cold water supply means includes a vessel or open tank 21 adapted to rest on top of the annular member 17 to provide a closure for the top of the well, so that there is a dead air space between the closure 19 at the top of the inner tank and the bottom of the upper vessel 21, serving to provide good heat insulation despite the fact that the tank closure may be conveniently removed at any time. This upper vessel acts both in the nature of a funnel and of a temporary reservoir. It is provided with a flange 21a to prevent the water from slopping over the other wall when a pailful is dumped in rather rapidly. The bottom of the vessel 21 is provided with a central opening adapted to be closed by a stopper 22. A farmer can, therefore, walk up to the heater with a bucketful of cold water, pour it in, set the bucket on the floor underneath the delivery spigot 23, and then pull out the stopper 22 in any appropriate manner. When this stopper is pulled out the cold water flows through a short connecting tube 24 of heat-insulating material, as rubber or plastic, into the pipe 20 and travels clear down to the bottom of such pipe. There it flows into the tank, displacing an equal quantity of hot water from the top of the tank, which is delivered through the spigot 23 to the bucket or any other desired receptacle. The relationship between the water supplied to the tank and the water delivered therefrom is never exactly and precisely equal. The difference in temperature between the incoming and outgoing water results in a volume difference; and the siphon delivery action always draws the water down to the bottom of the inner end of the siphon, so that the amount of water standing in the expansion space is always added to the volume of water poured in. Pouring in a half bucket of water, however, effects delivery of approximately a half bucket of water, and pouring in three-quarters of a bucket of water effects delivery of approximately three-quarters of a bucket of water; so that, as used in this specification and claims, the terms "equal quantity" are to be construed as meaning an approximately equal quantity.

In the center of the bottom 10c of the inner tank is located a holding member 25 into which the lower end of the piping 20 is adapted to be threaded. Flow from the bottom of the pipe 20 is out through openings in this holding member, as 25a, or through openings in the lower end of the pipe 20 immediately thereabove, as 20b, flow through these latter openings being directed downwardly by a deflector hood 20c mounted on the pipe 20. The holding member 25 has depending therefrom a tube 26 of heat-insulating material, as plastic, threaded at its lower end and normally closed by a plug 27. When it is desired to drain the heater without removing the inner tank therefrom, this can be done by merely removing the drain plug 27.

When it is desired to remove the closure member 19 from the inner tank to provide access for scrubbing the interior thereof, which may be desirable after a certain period of usage of the heater, the vessel 21 is first lifted off, the tube 24 either pulled off of a portion of this vessel or pulled up off the pipe 20. The pipe 20 is then rotated to screw its lower end back out of its threaded connection with the member 25 at the bottom of the tank. When this threaded connection has been severed, the pipe 20 and closure 19 easily lift right out of the heater. The inner walls of the tank 10 can be conveniently inspected, the water therein being drained off by removal of the plug 27 if desired. If the interior of the tank needs cleaning one may merely reach in with an arm and scrub the inner walls; or the whole inner tank may be conveniently removed from the heater for convenience in cleaning, if desired. Referring now more particularly to Figure 2, it will be seen that the spigot or discharge pipe 23, which has its inner end fastened to the top of the inner tank 10, passes out through the outer shell 12a through a slot 12a' which extends from the position of the spigot as shown in the drawings up to the top edge of the shell 12a. Any metal to metal contact between the pipe 23 and the outer shell is prevented by a grommet 28 of rubber or other heat-insulating material. The use of these various pieces of heat-insulating material (17, 24, 26 and 28) in all connections between the inner tank and the exterior shell prevents any direct metal conduction of heat from the inner tank to the outer shell to be dissipated thereby. When it is desired to remove the whole inner tank, the top 12b of the outer shell is removed and the thermostat 14 and the blocks of insulating material above the level of the inner cylindrical heat-insulating material 11 are removed whereupon the entire inner tank, including the discharge pipe 23 and the drainage pipe 26, easily slip right up out of the top of the heater. To facilitate this operation the electrical connections to the thermostat cartridge 14 may be of the plug-in type.

The discharge pipe 23 has several improvements associated with it. In the first place, it is made of a single piece of bendable tubing, obviating the necessity of pipe joints, elbows, and the like. The top 10b of the heater tank has a connector member 29 fastened therein, with a portion projecting down below the level of the top for a slight distance, as a half inch. This connector 29 has a tapered shoulder at the upper end thereof with a threaded portion immediately below such shoulder. The inner end of the discharge pipe 23 is a slip fit within the cylindrical portion of the connector 29, with a plastic or rubber sleeve surrounding such end, and the inner end of the pipe can then be held in place by merely screwing down the nut 30 to compress the sleeve and make a tight seal. The outer end 23a of this pipe preferably extends slightly below, as a half inch or an inch below, the bottom of the inner end of the delivery connection, this latter being provided by the depending portion of the connector element 29. It is preferable, in heaters of this displacement type, to have the delivery through a siphon arrangement, since this eliminates dripping or "dribbling" on to the floor under the spigot as the cold water in the heater heats up and expands. That is, with a straight overflow arrangement the quantity of cold water poured in forces out an equal volume of hot water, and then subsequent expansion of the cold water causes dripping through the delivery arrangement. By making this in the form of a siphon, expansion can be taken care of in the top of the tank in the space between the bottom of the outlet connection and the top 10b of the inner tank; yet once a quantity of cold water has been poured into the tank and delivery has been initiated, the siphon causes the water to keep flowing out until the level in the tank has reached the bottom of the inner end of the delivery connection as indicated by the dotted line. Considerable difficulty has been encountered with the siphon arrangements in practice after some use, however, and their failure has not heretofore been understood. I have discovered that the major cause of failure is the building up of lime or other deposits at the inlet side of the siphon until insufficient flow of water can take place at this inlet to support siphon action throughout the delivery pipe 23, so that air has heretofore entered at the delivery end. I have found that this difficulty can be obviated by making the delivery end 23a much smaller in area than the inner end of this discharge connection, so that even if some deposits or plugging occur at the inner end the area there still remains as large or larger than the area at the outer or delivery end 23a. I have found that the outer end of the pipe 23 should be preferably formed down or reduced in diameter so that the area of the discharge end is at least twenty per cent less than the area of the inner end, and preferably even somewhat less than that.

I have also designed and am using legs on this heater which are easy to form, easy to attach to the shell, and very rugged and satisfactory in usage. These legs are generally three in number, the two shown in Figure 1 being identified as 31 and 32. Since all of the legs are similar only one will be described. The leg 31, for example, is formed in a rectangular U-shaped channel of tapering form, substantially larger at the top than at the bottom, as illustrated. The open portion of the U extends toward the center of the heater, extending in sufficiently to bring the inner end of the leg channel portions directly under the rigid tank supports, to provide direct support for the weight of the inner tank when it is filled; and a portion of the outer part of the leg extends up the outside of the heater in contact with the outer vertical wall of the shell, this portion of the leg being here identified as 31a. At the bottom of this portion 31a is a slot adapted to receive the lower end of the shell 12a and the downwardly turned outer edge 12c; and then the inwardly turned sides of the leg, as the side 31c, extends in for two or three inches in contact with the bottom 12c and furnishing good support therefor. The result is a very sturdy and satisfactory leg and a very stable connection which can be held in place by only one or two screws.

Referring now more particularly to the embodiment of my invention illustrated in Figure 3, analogous reference numerals will be used and the description shortened, since most parts of this form of my invention correspond with those heretofore described in connection with the forms shown in Figures 1 and 2. The reference numerals used will in each case be fifty higher than those used on corresponding parts of the first modification of my invention.

In this modification shown in Figure 3, an inner tank 60 is again surrounded by a heat-insulating enclosure comprising heat-insulating material and an outer metal shell 62. Heating in this case is done by a cartridge type heating element here identified as 90, control being by a thermostat 64. The top of the tank is in this case provided with a radially inwardly extending flange 60b' defining a large central opening. As before, a well extending through the heat-insulating enclosure registers with this opening, the well being defined by a cylindrical member 66 and a top annular member 67 of heat-insulating material. In this case the closure 69 comprises upper and lower parts 69a and 69b. Both these parts and the flange are here provided with "flats" for a short portion of their circumference at diametrically opposed positions, so that the part 69b can be passed down into the heater beneath the flange 60b'. In this case the cold water supply pipe 70 makes no connection at the bottom of the inner tank, being spaced therefrom about an inch in its operative position as shown. Holding of the closure member in position at the top of the tank, and holding of the supply pipe 70 in proper position therein, is accomplished by providing a flange 70d on the pipe 70 beneath the closure part 69b, together with a threaded portion above the closure part 69a adapted to receive a wing nut 91.

As before, cold water poured into the vessel 71 passes down through the small connecting pipe 74 and through the pipe 70 to the bottom of the heater. Hot water at the top of the inner tank, displaced by this cold water, passes out through the delivery pipe 73, starting a siphon action which keeps the flow operating until the level of water in the inner tank has been drawn down to the level of the inner end of the delivery connection arrangement. In this case removal of the closure is effected by lifting off the receiver and then by unscrewing the wing nut 91 which releases the tension on the two opposed top parts of the closure. When this tension is completely released the parts may be turned until the lower part will come up through the opening, whereupon the pipe 70 and the closure parts 69 are lifted out of the inner tank. The tank may then be cleaned; or, if desired, the top part 62b of the shell and some of the top insulation may be removed, as described in connection with my first modification, to permit convenient removal of the inner tank. In the particular arrangement shown here no insulating sleeve or cylinder is used, the tank being supported at its lower end by a plurality of tank support brackets of rigid insulating material here identified as 92. As before, the removal of the inner tank takes with it the delivery pipe 73 and the drainage parts 75, 76 and 77. The heater is again supported by three legs, the two shown in the drawing being identified as 81 and 82.

This second form of my invention, as can be readily seen, has a closure which is positive in action and which also serves to carry the pipe 70, so that any difficulty with threading it into a member at the lower end of the tank is obviated. Since the pipe 70 normally tends to hang straight down, there is no particular sidewise strain on the resilient closure part 65, which may be of spring steel. Since the heating element 90 is in this case of the cartridge type screwed into the side wall of the inner tank 60 it must be removed before the inner tank can be removed, and it is sometimes preferable to remove it when the tank is being cleaned even though the tank is left within the heater.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A water heater of the displacement type, including: an inner tank having an opening of substantial area in the top thereof; a heat-insulating enclosure for said tank, the enclosure having a well registering with said opening; a readily-removable closure member adapted to be received in said well and to make sealing engagement with said tank to close said opening; and water supply means including a pipe passing through said closure member and extending to near the bottom of the tank and provided with an opening for discharging water thereinto.

2. A water heater of the displacement type, including: an inner tank having an opening of substantial area in the top thereof; an enclosure for said tank having a well registering with said opening, the enclosure comprising an outer metal shell and heat-insulating material therewithin; a readily-removable closure member adapted to be received in said well and to make sealing engagement with said tank to close said opening; and means at the top of the heater for supplying water to the tank and for delivering an equal quantity of water therefrom, the supply means including a pipe passing through said closure member and extending to near the bottom of the tank and provided with an opening for discharging water thereinto.

3. A water heater of the displacement type, including: an inner tank having an opening of substantial area in the top thereof; an enclosure for said tank having a well registering with said opening, the enclosure comprising an outer metal shell and heat-insulating material therewithin; a readily-removable closure member adapted to be received in said well and to make sealing engagement with said tank to close said opening; and means at the top of the heater for supplying water to the tank and for delivering an equal quantity of water therefrom, the supply means including a pipe passing through said closure member and extending to near the bottom of the tank and provided with an opening for discharging water thereinto and a tank placed over and closing the outer end of said well to provide a dead air space above said closure member.

4. A water heater of the displacement type, including: an inner tank having an opening of substantial area in the top thereof; a heat-insulating enclosure for said tank, the enclosure having a well registering with said opening; a readily-removable closure member adapted to be received in said well and to make sealing engagement with said tank to close said opening; and water supply means including a pipe passing through said closur member and extending to near the bottom of the tank and provided with an opening for discharging water thereinto, means for holding the closure member in sealing engagement with the tank.

5. A water heater of the displacement type, including: an inner tank having an opening of substantial area in the top thereof and a connector portion in the bottom thereof; a heat-insulating enclosure for said tank, the enclosure having a well registering with said opening; a readily-removable closure member adapted to be received in said well and to make sealing engagement with said tank to close said opening; and water supply means including a pipe passing through said closure member and provided with a lower end adapted to be removably connected to said connector portion and with means for holding the closure member in sealing engagement with the tank, said pipe lower end having an opening within the tank for discharging water thereinto.

6. A water heater of the displacement type, including: an inner tank having an opening of substantial area in the top thereof having a flange therearound; a heat-insulating enclosure for said tank, the enclosure having a well registering with said opening; a closure member adapted to be received in said well and comprising two parts making sealing engagement with opposite sides of said flange to close said opening; and water supply means including a pipe passing through said closure member and provided with means for holding the closure member in sealing engagement with the tank.

7. A water heater of the displacement type, including: an inner tank; and an enclosure for said tank comprising an outer metal shell, an inner heat insulating shell and a heat-insulating material therebetween, the top portion of said outer shell and the top part of the heat-insulating material being readily removable to permit removal of the tank from the enclosure, the outer shell being slotted near the top and the heater including a delivery pipe passing through said slot; and a water supply pipe extending through said top part to near the bottom of the tank to discharge water thereinto simultaneously with the passage of water outwardly through the delivery pipe.

8. A water heater of the character described, including: an inner tank; a heat-insulating enclosure for said tank, said enclosure including an outer shell; and a plurality of legs, each leg consisting of a channel formed of sheet metal so as to be larger at its upper than at its lower end and having a portion of its upper end engaging the bottom of said enclosure and a portion engaging the outside thereof; said outer shell having a downwardly extending marginal edge flange, and said legs each having a recess in which said marginal edge flange is seated.

9. A water heater of the displacement type, including: an inner tank having an opening of substantial area in the top thereof having a flange therearound; a heat-insulating enclosure for said tank, the enclosure having a well registering with said opening; a closure member adapted to be received in said well and comprising two parts movable toward and away from each other, at least one part making sealing engagement with a side of said flange to close said opening; and water supply means including a pipe passing through said closure member and provided with means for holding said one part in sealing engagement with the flange.

10. A water heater of the character described, including: an inner tank; a heat-insulating enclosure for said tank; and means at the top of the heater for supplying water to the tank and for delivering an equal quantity of water therefrom, the delivery means comprising a siphon pipe with an outer end of smaller cross-sectional area of opening than in the remainder of the pipe.

11. A water heater of the character described, including: an inner tank; a heat-insulating enclosure for said tank; and means at the top of the heater for supplying water to the tank and for delivering an equal quantity of water therefrom, the delivery means comprising a siphon connection with its inner end extending slightly down into the tank at the top thereof and its outer end extending outside of said enclosure and below the inner end, the outer end being lesser in area than the inner end.

12. A water heater of the character described, including: an inner tank; a heat-insulating enclosure for said tank; and means at the top of the heater for supplying water to the tank and for delivering an equal quantity of water therefrom, the delivery means comprising a siphon connection with its inner end extending slightly down into the tank at the top thereof and its outer end extending outside of said enclosure and below the inner end, the outer end being at least twenty per cent lesser in area than the inner end.

EUGENE W. LOSEE.

REFERENCES CITED

The following references are of record in the file of this patent:

UNITED STATES PATENTS

| Number | Name | Date |
| --- | --- | --- |
| 2,356,784 | Graham | Aug. 29, 1944 |
| 1,157,111 | Keep | Oct. 19, 1915 |
| 1,442,048 | Christian | Jan. 16, 1923 |
| 1,444,262 | Morrison | Feb. 6, 1923 |
| 2,012,101 | Hynes | Aug. 20, 1935 |
| 2,056,941 | Krichton | Oct. 13, 1936 |
| 2,146,022 | Losee | Feb. 7, 1939 |
| 2,248,007 | Michaels | July 1, 1941 |
| 2,269,448 | Ferris II | Jan. 13, 1942 |
| 2,299,053 | Ferris I | Oct. 13, 1942 |